Oct. 6, 1931.  R. HERVIG ET AL  1,826,542

POPPET VALVE AND PROCESS OF MAKING SAME

Filed May 12, 1922

Inventors:
Richard Hervig
Robert Jardine
By Gillson & Gillson
Attys.

Patented Oct. 6, 1931

1,826,542

UNITED STATES PATENT OFFICE

RICHARD HERVIG AND ROBERT JARDINE, OF CHICAGO, ILLINOIS, ASSIGNORS TO RICH TOOL COMPANY, OF PORTLAND, MAINE, A CORPORATION OF MAINE

POPPET VALVE AND PROCESS OF MAKING SAME

Application filed May 12, 1922. Serial No. 560,302.

The invention relates to poppet valves and especially to those intended for use in internal combustion engines. In the construction of these valves it is frequently desirable to form different parts of the valve from different materials. For example, in order that the operation of the valve will not be affected by changes in temperature, a steel alloy having a low coefficient of expansion is advantageously employed for the stem while a harder material, capable of resisting mechanical abrasion, even at high temperatures, and preferably also having the quality of resisting corrosion, is better suited for the valve head and particularly the rim or seating portion thereof. In fact, since the highest temperatures are attained in the central portion of the head adjacent the stem, formation of the interior or body portion of the head from the same material employed for the stem has been desirable in avoiding unequal expansion in different parts of the head.

In any event, since a mechanical connection of parts cannot be depended upon to remain intact during the continued rapid reciprocating movements of the valve and the reliability of a welded joint can only be determined by testing the same to destruction, there is always uncertainty as to the performance of a valve when two or more pieces, whether of the same or different materials, are employed for its construction. The invention accordingly contemplates the manufacture of a poppet valve having its stem and the outer portion of the head formed from different pieces, but so interlocked that their separation in service is impossible. The object of the invention is the provision of an improved two piece valve of the character indicated and a novel process of making the same.

Figure 1:
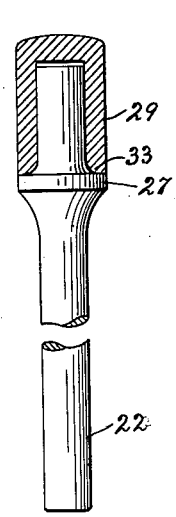
Fig. 1 is a side elevation, partly in section, showing an assembly of the two pieces from which one form of the improved valve may be produced.
Figure 2:
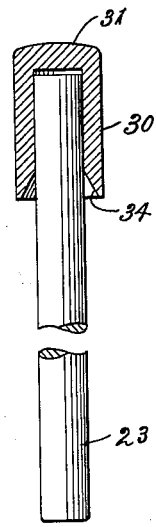
Fig. 2 is similar to Fig. 1, but shows a slightly different form of the two pieces which may be employed in carrying out the invention.
Figure 3:
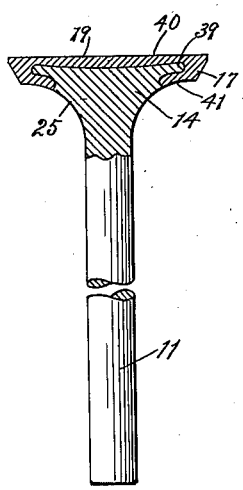
Figure 4:
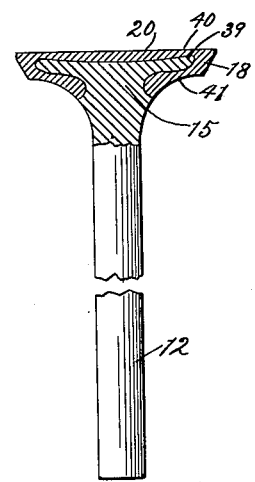
Figure 5:
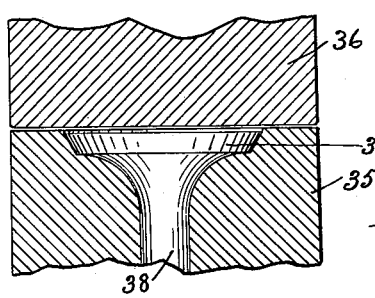

Figs. 3 and 4 are side views, each partly in section, illustrating the completed valves produced by the improved method from the different assemblies of pieces shown in Figs. 1 and 2 respectively, and Fig. 5 is a central sectional view conventionally representing the form of forging dies which may be used in producing any one of the valves illustrated in Figs. 3 and 4.

Each of the several valves illustrated in the drawings has the stem 11 or 12 and the adjacent central or interior portion 14 or 15 of the valve head formed integral and from the same material while the rim or seating portion 17 or 18 of the valve head is in each case formed from a separate piece, preferably of different material. The invention is in nowise limited to the particular character of the materials employed for these two parts of the valve. Desirable results are secured, however, if a high nickel steel containing up to thirty-six per cent nickel is employed for the first mentioned parts and a non-corrosive steel alloy having the red hardness property is employed for the rim or seating portion of the valve. A chrome-cobalt alloy steel containing approximately twelve per cent chromium and three and one-half per cent cobalt is an example of the latter material, but other alloys having the properties desired for this part of the valve are known. In the forms of construction illustrated in Figs. 3 and 4, the material employed for the rim or seating portion of the valve also extends continuously over and constitutes the upper surface portion 19 or 20 of the valve head.

To avoid unnecessary working of material, a rod, as 22 or 23, is preferably selected for the formation of the valve stem and the adjacent portion of the valve head. In order that a substantial part of the valve head comprising the said central or interior portion, 14 or 15 thereof, may be formed by the expansion of an end portion of this rod, the rod is desirably in each case of greater length than the total length of the valve. Furthermore, a larger part of the underside of the valve head adjacent the stem, as at 25 (Fig. 3), is formed from the same piece, if the corresponding rod 22 (Fig. 2) is provided with an annular enlargement 27.

The piece selected for the formation of the rim or seating portion 17 or 18 of the valve head is applied to the end of the corresponding stem rod in the form of a thimble 29 or 30 (Figs. 1 and 2). In event the said annular enlargement 27 is provided upon the stem rod, the thimble 29 preferably extends to and is supported by the corresponding annular enlargement of the stem during expansion of the same for the formation of the valve head. However, since engagement of the closed outer end 31 of the thimble, as 30, (Fig. 2) with the end of the stem rod, will prevent relative displacement of the parts during their expansion, a stem rod of uniform diameter throughout may be employed when the said thimble is used. On the other hand, to obtain the desired line of contact between the said two pieces in the finished article, the inner end of thimble 29, 30, is preferably chamfered upon the inside in all cases, as at 33 and 34. Likewise, when the annular enlargement 27 is provided upon the stem rod, this annular enlargement is desirably beveled to conform in shape with the said chamfered end 33 of the corresponding ring band or thimble.

Expansion of the end portion of the stem rod and the thimble mounted thereon to produce the valve head, is accomplished by forging the same between dies, as 35, 36, (Fig. 5). As shown, the die 35 is formed with a depression 37 conforming in shape with the underside of the valve head and with a central opening 38 to receive the valve stem. The result of this operation upon parts of the form shown is in each case to produce a flattened enlargement 39 of the stem rod and this enlargement of the stem rod is located between, and therefore interlocked with, less enlarged portions 41 of the thimble. A permanent and thoroughly reliable joint is accordingly provided between the two pieces from which the valve is formed. Welding, before forging, may, however, be resorted to, if desired. In any event, welding of the thimble 29 (Fig. 1) to the corresponding stem rod, at the line of contact of chamfered inner end 33 of the said ring band or thimble with the adjacent beveled edge of the annular enlargement 27 of the stem rod, should be sufficient and is optional.

The particular form of stem within the envelope of the head metal is a variable to be controlled by the depth to which the rod is inserted, the shape of the blank of the envelope metal, the shape of the dies, or the treatment in forging, etc.

For example, the depression 42 may be increased, reduced or eliminated. The flange 39 may be varied widely from a sharp edged disk to a rotund enlargement, etc.

The invention was made with special reference to the manufacture of poppet valves for internal combustion engines, and the foregoing disclosure has been primarily directed to that use of it. But the description and illustration will be sufficient to make the substance of the invention available for producing valve tappets, tappet screws and other composite headed articles, where it is desired to envelope one metal about an insert of another metal in intimate contact, and it is intended that the claims shall be given corresponding scope.

We claim as our invention:

1. The process of making a composite metal article having a stem and expanded head which includes applying a thimble having a closed end to one end of a separately formed stem rod, and expanding the side wall of the thimble and the part of the stem rod enclosed thereby by endwise pressure between dies conforming in shape with the head.

2. The process of making a composite metal article having a stem and expanded head which includes entering an end portion of a stem rod having a circumferential enlargement adjacent said end into a separately formed thimble having a closed end for contact of the rim of the thimble with the adjacent side of the said circumferential enlargement of the stem rod, and expanding the side wall of the thimble and the part of the stem rod enclosed thereby, by endwise pressure between the dies conforming in shape with the head.

3. The process of making a composite metal article having a stem and expanded head which includes applying a thimble having a closed end to one end of a separately formed stem rod, welding the said two pieces together, and expanding the side wall of the thimble and the part of the stem rod enclosed thereby by endwise pressure between dies conforming in shape with the head.

4. The process of making a composite metal article having a stem and expanded head, which includes entering an end portion of a stem rod having a circumferential enlargement adjacent said end into a separately formed thimble having a closed end for contact of the rim of the thimble with the said circumferential enlargement of the stem rod, welding the said two pieces together along the line of contact between the rim of the thimble and the circumferential enlargement of the stem rod, and expanding the side wall of the thimble and the part of the stem rod enclosed thereby by endwise pressure between dies conforming in shape with the head.

5. The process of making a composite metal article which includes applying a thimble having a closed end to one end of a separately formed stem rod and radially expanding the thimble and encircled portion of the stem to produce the head.

6. The process of making a composite metal article which includes inserting one end of a rod into a pocket in a block and applying force to the block to distort the rod and form the block into a head, surrounding the distorted portion of the rod.

7. The process of making a composite metal article which includes inserting one end of a rod into a pocket in a block and forging them together to distort the rod and form the block into a head enveloping the distorted portion of the rod.

8. A composite poppet valve comprising, in combination, a stem having an irregular portion adjacent to one end and a head interlocked therewith in the condition produced by inserting a stem into a pocket in a block of head metal and hot forging the irregular portion and the head by force exerted lengthwise to the stem.

9. A composite metal article of the class described comprising, in combination, a stem having a distorted portion adjacent to one end and a head extending continuously across the end of the stem and around the distorted portion, said head and stem being interlocked in the condition produced by inserting the stem into a pocket in a block of head metal and hot forging the block and stem to form the head and distort the stem.

10. A composite metal article of the class described comprising, in combination, a stem having an enlargement adjacent to one end and a head extending continuously across the end of the stem and interlocked with the enlargement in the condition produced by inserting the stem into a pocket in a block of head metal and radially expanding the block and the portion of the stem within the block.

11. A composite metal article of the class described comprising, in combination, a stem having a flattened knob at one end and a head extending continuously over the top of said knob and inwardly underneath its rim, said parts in a condition produced by inserting the stem in a pocket in a block of head metal of greater length than the thickness of the finished head and radially expanding the enclosed portion of the stem and the block by forcing them into a die while heated.

12. As a new article of manufacture, a forged headed stem, composed of two pieces of forgeable metal, and comprising a disc like head portion and a stem portion, irremovably secured thereto, one end of the stem portion being concave and having a widely flaring laterally extending end part embedded in that part of the metal of the head which projects beyond the sides of the stem, the metal of the head portion being thickened at its middle part and entering the concave space in the flaring end part of the stem, and both faces of said flaring end part being held in intimate contact with and by the contiguous metal of the head portion, located on opposite sides of said flaring end part of the stem.

13. As a new article of manufacture, a forged headed stem, composed of two pieces of forgeable metal and comprising a disc like head portion and a stem portion irremovably secured thereto, the stem portion having a widely flaring, laterally extending end part embedded in that part of the metal of the head which projects beyond the stem and the metal of the head portion being thickened at its middle part and entering the space contained in the flaring end part of the stem and both faces of said flaring end part being in intimate contact with the contiguous metal of the head portion located on opposite sides of said flaring end part of the stem.

14. An article of manufacture comprising, a disc like head portion and a stem, composed of two pieces of metal, one piece forming the major and exterior portion of the head, and the other piece forming the stem and interior portion of the head, the stem having a concave solid end part forming an abutment for the inner face of the exterior portion of the head and having, beyond said solid part, an annular, laterally extending, relatively thin web portion projecting into the metal of the exterior portion of the head, the metal of the exterior portion of the head being thickened at its middle and conforming generally to the shape of the adjacent concave end face of the stem part, and the exterior and interior parts of the head being integral with each other.

15. An article of manufacture comprising, a disc like head portion and a stem composed of two pieces of metal, one piece forming the major and exterior portion of the head, and the other piece forming the stem and interior portion of the head, the stem having a solid concave end part at the head end forming an abutment for the exterior portion of the head and having beyond said solid part, an annular, laterally extending, relatively thin web portion projecting into the metal of the exterior portion of the head, the metal of the exterior portion of the head being thickened at its middle and conforming generally to the shape of the adjacent concave end face of the stem part, and the exterior and interior parts of the head being integral with each other and being denser than the stem.

16. An article of manufacture comprising, a disc like head portion and a stem, composed of two pieces of metal, one piece forming the major and exterior portion of the head and having higher heat resisting properties than the stem, and the other piece forming the stem and interior portion of the head, the stem having a solid concave end part forming an abutment for the exterior portion of the head and having, beyond said solid part, an annular, laterally extending, relatively thin web portion projecting into the metal of the exterior portion of the head, the exterior part of the head being thickened towards its middle and abutting against said concave end part of the stem, and the exterior and interior parts of the head being integral with each other.

17. An article of manufacture comprising, a disc like head portion and a stem composed of two pieces of metal, one piece forming the major and exterior portion of the head, and the other piece forming the stem and interior portion of the head, the stem having a solid, concave end part forming an abutment for the exterior portion of the head and terminating in a widely flaring, thin web which extends laterally into the metal of the exterior portion of the head, the exterior portion of the head being thickened towards its middle and the inner face of the exterior portion of the head conforming with the contiguous part of the stem contained in the head and being integral therewith.

18. An article of manufacture comprising a disc like head portion and a stem composed of two pieces of metal, one piece forming the major and exterior portion of the head, and the other piece forming the stem and interior portion of the head, the stem having a solid, concave end part forming an abutment for the exterior portion of the head and terminating in a widely flaring, thin web which extends laterally into the metal of the exterior portion of the head, the exterior portion of the head being thickened towards its middle and the inner face of the exterior portion of the head conforming with the contiguous part of the stem contained in the head and being integral therewith.

19. The method of making a metallic element having a diametrically enlarged end portion which consists in taking a body of metal having a recess formed therein, which terminates intermediately of the ends of such body of metal; inserting the end portion of a second metallic member into such recess; and then heating and upsetting the metal so associated.

20. The method of making an unfinished poppet valve or the like, which includes taking a body of metal suitable for use as a head; forming a cylindrical bore in such metal terminating within the latter; inserting the end portion of a cylindrical rod of substantially the same diameter as said bore, into the latter; heating the metals so associated, and then upsetting same.

21. The process of making composite headed articles which includes placing an insert of one metal in a pocket in a block of another metal and simultaneously hot forging the assembly to form a head and join the insert to the enveloping metal of the block.

RICHARD HERVIG.
ROBERT JARDINE.